United States Patent
Takahashi

(10) Patent No.: US 7,454,133 B2
(45) Date of Patent: Nov. 18, 2008

(54) SOLID-STATE IMAGE SENSOR AND AUTOMATIC-FOCUS CAMERA USING THE SAME

(75) Inventor: Hidekazu Takahashi, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 448 days.

(21) Appl. No.: 11/205,208

(22) Filed: Aug. 17, 2005

(65) Prior Publication Data

US 2006/0045506 A1    Mar. 2, 2006

(30) Foreign Application Priority Data

Aug. 26, 2004   (JP) .............................. 2004-246797

(51) Int. Cl.
  G03B 3/00    (2006.01)
  G03B 3/10    (2006.01)
  G03B 13/34   (2006.01)
  G03B 13/00   (2006.01)
  H04N 5/232   (2006.01)

(52) U.S. Cl. .................... 396/96; 396/101; 348/345; 348/350; 250/201.7

(58) Field of Classification Search ................ 396/54, 396/96, 121, 101, 102, 104, 111, 123, 128; 348/312, 315, 241, 350, 294, 300, 308, 345; 354/402, 407; 257/292; 250/201.7; 358/463, 358/513

See application file for complete search history.

(56) References Cited

U.S. PATENT DOCUMENTS

| 4,831,403 A | 5/1989 | Ishida et al. ................. 354/402 |
| 4,882,601 A | 11/1989 | Taniguchi et al. ........... 354/407 |
| 4,910,548 A | 3/1990 | Taniguchi et al. ........... 354/407 |
| 5,023,646 A | 6/1991 | Ishida et al. ................. 354/402 |

(Continued)

FOREIGN PATENT DOCUMENTS

EP   1085751 A2   3/2001

(Continued)

OTHER PUBLICATIONS

Hidekazu Takahashi, et al., "CMOS Linear Autofocus Sensor for 7-point Wide Area Autofocus System", Technical Report of the Institute of Image Formation and Television Engineers, vol. 25, No. 28, pp. 1-6 (Mar. 2001).

(Continued)

Primary Examiner—Melissa Jan Koval
(74) Attorney, Agent, or Firm—Fitzpatrick, Cella, Harper & Scinto

(57) ABSTRACT

A solid-state image sensor for automatic focus with highly precise automatic focus performance is realized at low cost. In the solid-state image sensor for automatic focus which has paired linear sensors (L1 to L10) respectively provided with linear sensors for standard portion (L1-B to L10-B) and linear sensors for reference portion (L1-R to L10-R) for performing phase difference detection type focus detection, a linear sensor for standard portion L6-B of paired linear sensors L6 is arranged between a linear sensor for standard portion L5-B and a linear sensor for reference portion L5-R of paired linear sensors L5, and a linear sensor for reference portion L5-R of paired linear sensors L5 is arranged between a linear sensor for standard portion L6-B and a linear sensor for reference portion L6-R of paired linear sensors L6.

8 Claims, 16 Drawing Sheets

U.S. PATENT DOCUMENTS

| | | | |
|---|---|---|---|
| 5,168,299 A | 12/1992 | Taniguchi et al. | 354/407 |
| 5,218,395 A | 6/1993 | Taniguchi et al. | 354/407 |
| 5,539,493 A | 7/1996 | Kusaka | 354/402 |
| 5,740,477 A | 4/1998 | Kosako et al. | 396/101 |
| 5,950,022 A | 9/1999 | Hagiwara | 396/121 |
| 6,704,051 B1 | 3/2004 | Takahashi | 348/315 |
| 6,781,624 B1 | 8/2004 | Takahashi | 348/241 |
| 6,803,614 B2 | 10/2004 | Takahashi | 257/292 |
| 6,973,265 B2 | 12/2005 | Takahashi | 396/121 |
| 2003/0160887 A1 | 8/2003 | Takahashi | 348/350 |
| 2006/0177210 A1* | 8/2006 | Ichimiya | 396/96 |

FOREIGN PATENT DOCUMENTS

| | | |
|---|---|---|
| EP | 1085751 A3 | 12/2002 |
| JP | 61-62011 | 3/1986 |
| JP | 63-246709 | 10/1988 |
| JP | 6-265774 | 9/1994 |
| JP | 6-313844 | 11/1994 |
| JP | 7-287161 | 10/1995 |
| JP | 8-76174 | 3/1996 |
| JP | 8-286103 | 11/1996 |
| JP | 8-292366 | 11/1996 |
| JP | 08-292366 | 11/1996 |
| JP | 9-121312 | 5/1997 |
| JP | 10-26723 | 1/1998 |
| JP | 2000-180706 | 6/2000 |
| JP | 2001-083407 | 3/2001 |
| JP | 2003-107340 | 4/2003 |
| JP | 2005-109370 * | 4/2005 |

OTHER PUBLICATIONS

Jan. 16, 2007 Japanese Official Action in Japanese Patent Appln. No. 2004-246797 (with partial translation).

Apr. 12, 2007 Japanese Official Action in Japanese Patent Appln. No. 2004-246797 (with partial translation).

Translation of Jan. 16, 2007 Japanese Official Action in Japanese Patent Appln. No. 2004-246797.

Translation of Apr. 12, 2007 Japanese Official Action in Japanese Patent Appln. No. 2004-246797.

* cited by examiner

| FIG. 8A | FIG. 8B |

| FIG. 9A | FIG. 9B |

| FIG. 14A | FIG. 14B |

CHIP SIZE IN CASE THAT BASE LINE LENGTH IS SIMPLY ENLARGED

SOLID-STATE IMAGE SENSOR AND AUTOMATIC-FOCUS CAMERA USING THE SAME

BACKGROUND OF THE INVENTION

Field of the Invention

The present invention relates to an improvement in the precision of a solid-state image sensor for automatic focus, and more particularly to a TTL-SIR (Through The Lens Secondary Imaged Registration) type automatic focus sensor, and an automatic-focus camera using the TTL-SIR type automatic focus sensor.

A conventional TTL-SIR type automatic focus sensor is disclosed by the present applicants in detail in "CMOS linear type automatic focus sensor for wide visual field seven point AF," Technical Report of the Institute of Image Formation and Television Engineers, Vol. 25, No. 28, pp. 1-6 (2001). FIG. 11 shows a linear sensor arrangement layout of a solid-state image sensor for automatic focus. In order to perform seven-point range finding including central cross range finding, eight paired linear sensors 131 are arranged on a same semiconductor substrate 130 corresponding to each ranging finding point. Two paired linear sensors which are horizontally and vertically arranged, respectively, are provided in the form of a cross corresponding to the central range finding point, thereby making it possible to effect the cross range finding for performing both the longitudinal line sensing and the lateral line sensing. These devices make luminous flux passing through a photographing lens re-focused through a secondary image forming optical system to form an object image at two positions which are respectively set on a linear sensor for standard portion 132 and on a linear sensor for reference portion 133, on an AF (automatic focus) sensor. Then, the devices detect a phase difference between the two object images to obtain the defocus quantity (in practice, raising the resolution of the range finding by performing a correlation operation between the signal of the standard portion and the signal of the reference portion). The detection precision of this method considerably depends upon a pixel pitch P of the linear sensors and a base line length (distance between the optical centers of the linear sensor for standard portion and of the linear sensor for reference portion). In general, the automatic focus precision can be improved by making the pixel pitch narrower and the base line length longer.

In the recent several years, the number of range finding points tends to be increased. FIG. 12 shows an example of linear sensor arrangement in a nine-point AF sensor. In order to make possible the range finding of diagonal positions, the fifth paired linear sensors 131-5 and the sixth paired linear sensors 131-6 are arranged side by side in the longitudinal direction. In this case, as shown in FIG. 13, AGC circuits 134-5, 134-6 are provided corresponding to each range finding point.

In the above described prior art form, two methods of miniaturizing the pixel pitch and of extending the base line length are considered in order to improve the automatic focus precision. However, a microfabrication process essentially needs to be introduced in order to reduce the pixel pitch without lowering the sensitivity, and a long development period and tremendous development costs are needed to build up the microfabrication process. This makes it impossible to develop a low cost solid-state image sensor for automatic focus for a short period of time. Accordingly, it is preferred to make the pixel pitch the same as before by using the same conventional process. In this case, in order that the automatic focus precision is improved to be higher than before, it is necessary to extend the base line length, as described above. However, simply extending the base line length (for example, extending the interval between line 5-standard portion and line 5-reference portion, and the interval between line 6-standard portion and line 6-reference portion, in order to extend the base line length in FIG. 13), results in an increase in the chip size, as shown in FIGS. 14A and 14B. Accordingly, this method has a problem that the chip cost is increased.

SUMMARY OF THE INVENTION

An object of the present invention is to realize a solid-state image sensor for automatic focus having highly precise automatic focus performance at low cost.

In order to achieve the above described object, according to the present invention, there is provided a solid-state image sensor for automatic focus having at least a first and second paired linear sensors, each comprising a linear sensor for standard portion and a linear sensor for reference portion, for performing phase difference detection type focus detection, the linear sensor for standard portion of the second paired linear sensors being arranged between the linear sensor for standard portion and the linear sensor for reference portion of the first paired linear sensors, the linear sensor for reference portion of the first paired linear sensors being arranged between the linear sensor for standard portion and the linear sensor for reference portion of the second paired linear sensors, and a dummy pixel being provided for at least one of portions between the linear sensor for standard portion and the linear sensor for reference portion, which are adjacent to each other, between the plural linear sensors for standard portion, and between the plural linear sensors for reference portion.

In the above described configuration, since the base line length can be extended in the same chip size as before, a solid-state image sensor corresponding to high automatic focus precision can be realized without increasing the manufacturing cost of the chip, and the provision of the dummy pixel makes a layout pattern uniform (making wiring density and active areas arranged in a uniform manner), as a result of which the work precision of the process can be improved so as to increase the yield.

According to the present invention, it is possible to realize a solid-state image sensor for automatic focus which is low cost while having a high precision. In addition, a single lens reflex camera which is highly precise, small in size and low cost, can be realized by applying the solid-state image sensor for automatic focus according to the present invention to the digital single lens reflex camera.

DETAILED DESCRIPTION OF THE PREFERRED EMBODIMENTS

In the following, preferred embodiments according to the present invention will be described in more detail with reference to the accompanying drawings.

First Embodiment

Figure 1:
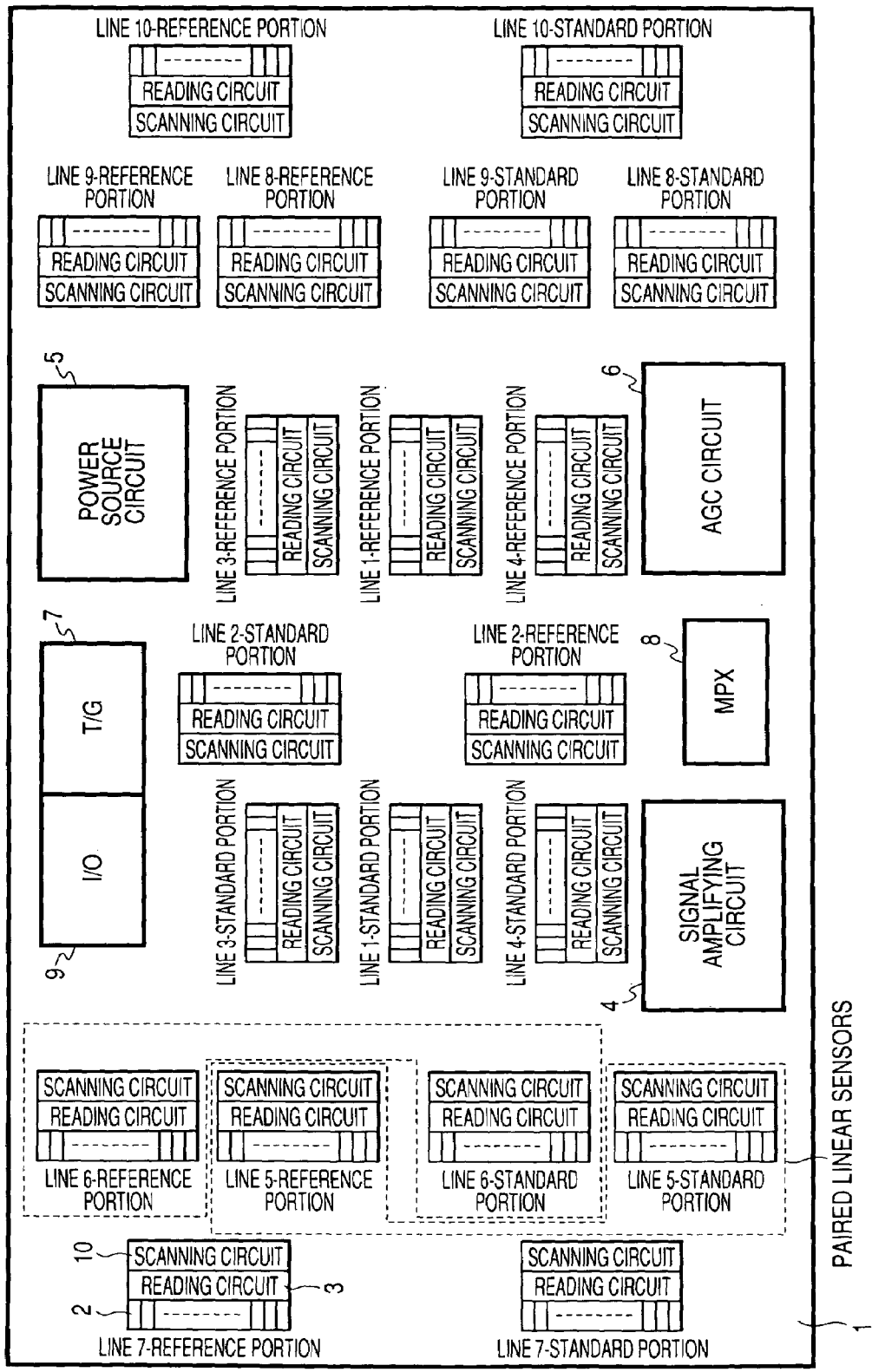
FIG. 1 shows a plane layout of a first embodiment according to the present invention.

FIG. 1 is a figure which best illustrates features of the present invention, and which schematically shows a plane layout of a solid-state image sensor according to the present invention. In FIG. 1, reference numeral 1 denotes a Si semiconductor substrate, 2 denotes a photodiode away constituting a linear sensor, 3 denotes an AF sensor reading circuit, 4 denotes a signal amplifying circuit amplifying a signal from an AF sensor block, and 5 denotes a power source circuit for operating analog circuits. Further, reference numeral 6 denotes an AGC circuit for determining a storage period of AF sensor and a gain of a signal output circuit, 7 denotes a logic circuit (T/G) for driving sensors, and 8 denotes a multiplexer circuit (MPX) for selecting and reading various kinds of analog signals. Further, reference numeral 9 denotes an input output circuit (I/O), and 10 denotes a scanning circuit scanning the AF sensor reading circuit 3.

The photodiode array 2 is divided into a linear sensor for standard portion and a linear sensor for reference portion, and paired linear sensors are constituted by the linear sensor for standard portion, the linear sensor for reference portion, the reading circuit 3, and the scanning circuit 10. In FIG. 1, ten paired linear sensors are arranged. A line n-standard portion represents a linear sensor for standard portion of n-th (n=1, 2, ..., 10) paired linear sensors. A line n-reference portion represents a linear sensor for reference portion of n-th (n=1, 2, ..., 10) paired linear sensors.

Figure 2:
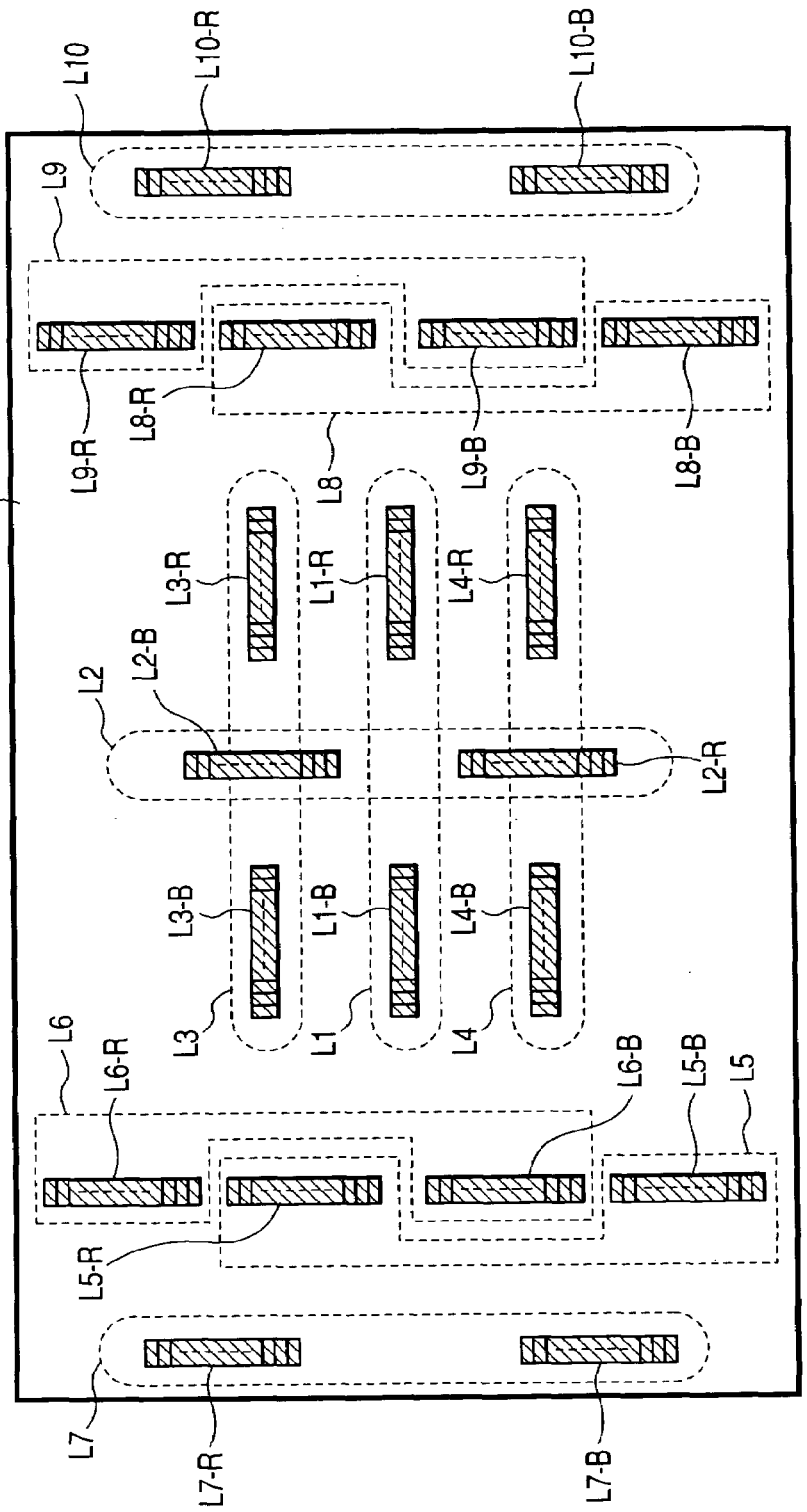
FIG. 2 shows a layout pattern of photodiode arrays (linear sensors) of a solid-state image sensor shown in FIG. 1.

FIG. 2 is a figure showing only a layout of the photodiode arrays (linear sensors) of the solid-state image sensor shown in FIG. 1. In FIG. 2, reference characters L1 to L10 denote each of the paired linear sensors including the linear sensor for standard portion and the linear sensor for reference portion (with the reading circuit 3 and the scanning circuit 10 omitted). In each of the paired linear sensors, Ln-B represents a linear sensor for standard portion of the n-th (n=1, 2, ..., 10) paired linear sensors, and Ln-R represents a linear sensor for reference portion of the n-th (n=1, 2, ..., 10) paired linear sensors. As can be seen from FIG. 2, in the present embodiment, the linear sensor for standard portion L6-B of the sixth paired linear sensors L6 is arranged between the linear sensor for standard portion L5-B and the linear sensor for reference portion L5-R of the fifth paired linear sensors L5. Further, the linear sensor L5-R for reference portion of the fifth paired linear sensors L5 is arranged between the linear sensor for standard portion L6-B and the linear sensor for reference portion L6-R of the sixth paired linear sensors L6.

In the arrangement shown in FIG. 2, the linear sensors for standard portion (L5-B, L6-B) of the fifth and sixth paired linear sensors are also arranged in the order, so as to constitute a linear sensor area for standard portion. Further, the linear sensors for reference portion (L5-R, L6-R) of the fifth and sixth paired linear sensors are arranged in the order, so as to constitute a linear sensor area for reference portion (here, the linear sensor area for standard portion and the linear sensor area for reference portion are disposed adjacent to each other). This is also an arrangement enabling the interval between the linear sensors for standard portion to be the same as the interval between the linear sensors for reference portion.

In the eighth and the ninth linear sensor pairs L8, L9, linear sensors for standard portion and linear sensors for reference portion are also arranged in the same manner as those in the fifth and the sixth linear sensor pairs L5, L6.

Figure 3:
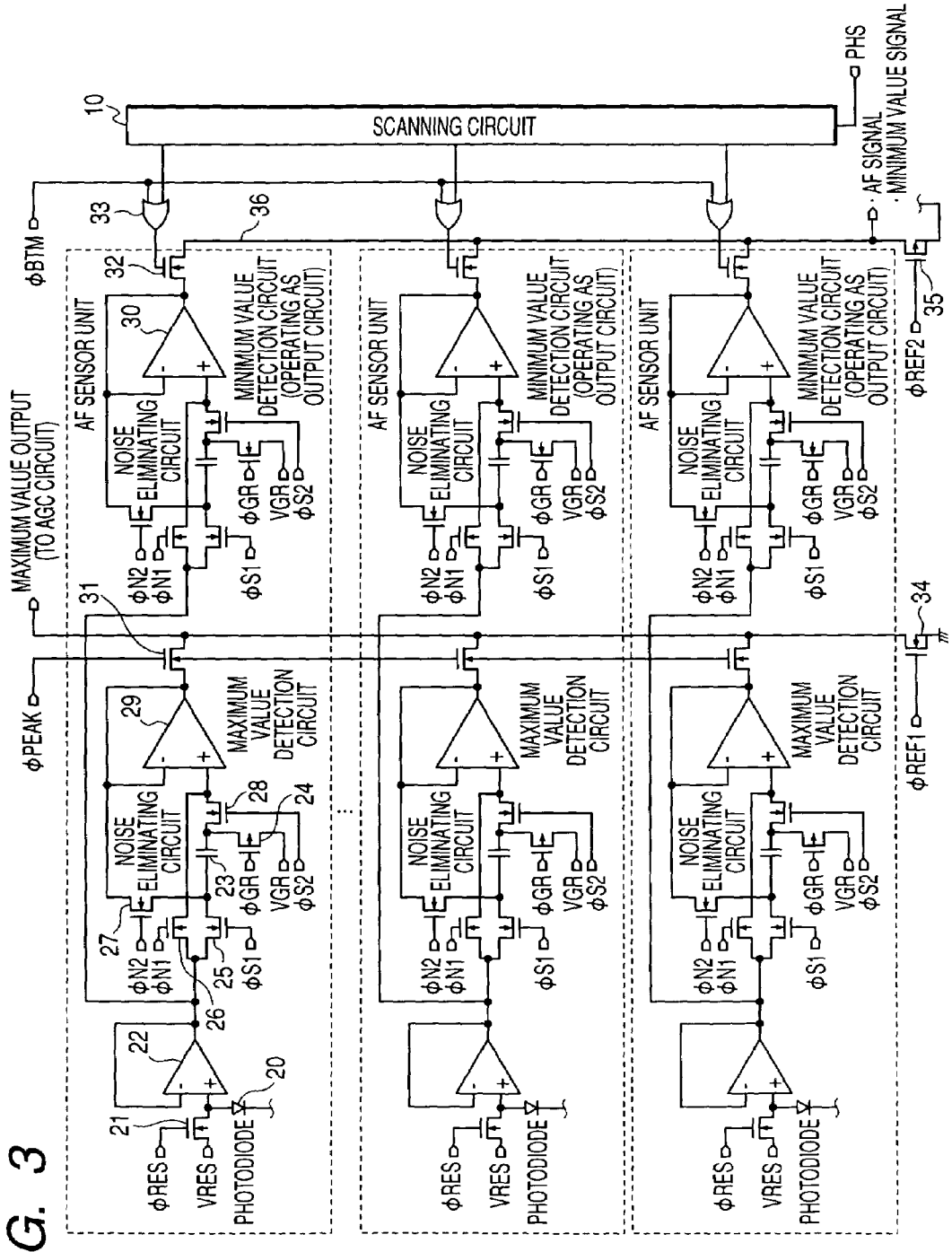
FIG. 3 is a figure showing an AF circuit configuration of the first embodiment according to the present invention.
Figure 4:
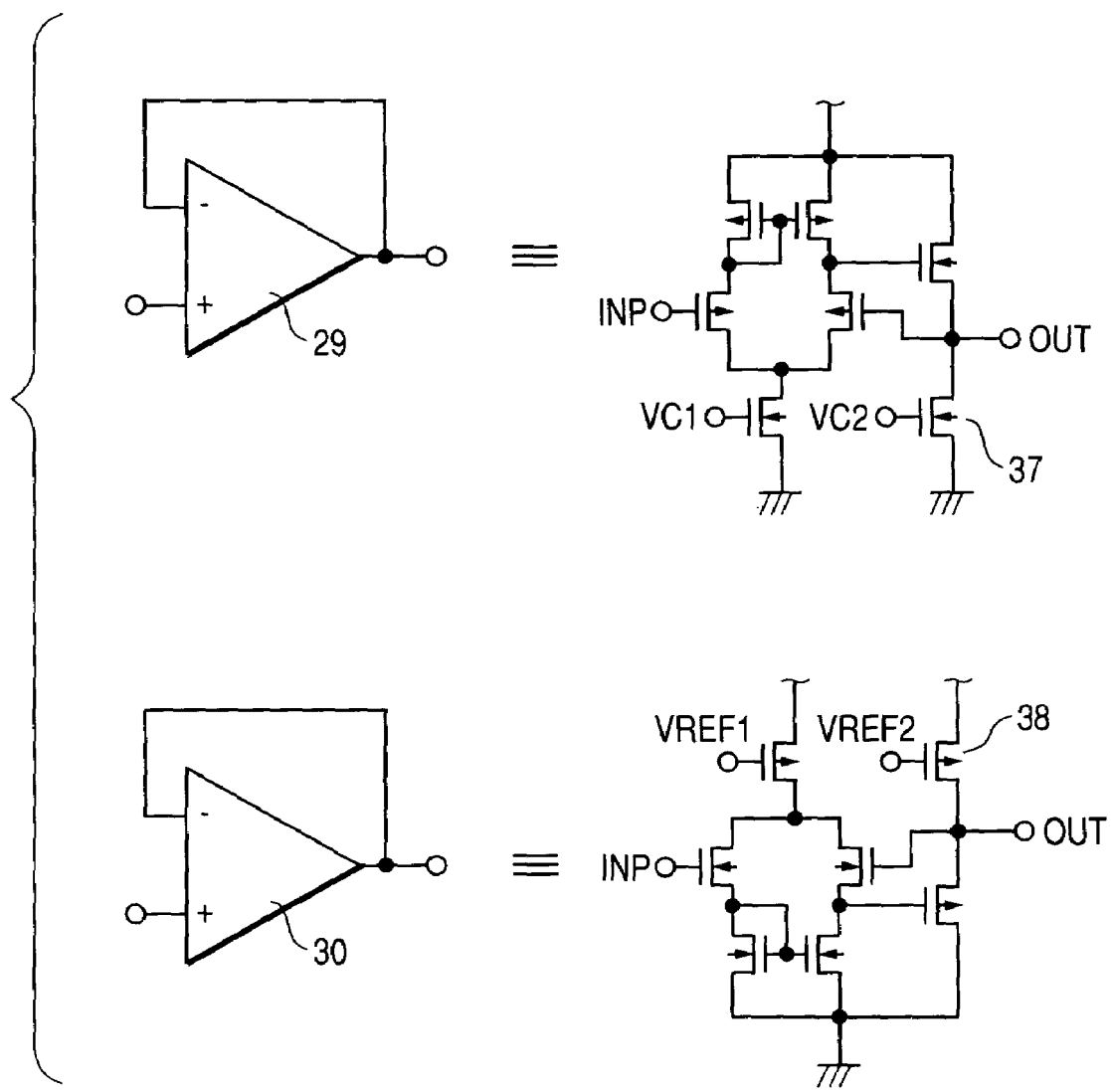
FIG. 4 is a figure showing a specific circuit configuration of differential amplifiers 29, 30.

Next, a specific circuit diagram of AF linear sensor circuit comprising the photodiode array 2 and the AF sensor reading circuit 3 is shown in FIG. 3. FIG. 4 is a figure showing a specific circuit configuration of differential amplifiers 29, 30. The AF linear sensor circuit (CMOS linear type AF sensor) shown here is a circuit previously proposed by the present applicants in Japanese Patent Application Laid-Open No. 2000-180706 and the like. The AF linear sensor circuit comprises plural AF sensor units.

In FIG. 3, reference numeral 20 denotes a pn junction photodiode performing photoelectric conversion, 21 denoting a MOS transistor for resetting which resets a potential of the photodiode 20 to VRES. Further, reference numeral 22 is a differential amplifier of which non-inverting input terminal (+) is connected to the photodiode 20, and of which inverted input terminal (−) and output terminal are connected with each other. The pn junction photodiode 20, the MOS transistor 21 for resetting and the differential amplifier 22 constitute an amplification type photoelectric conversion element, which serves as one of pixels of the photodiode array 2.

Reference numeral 23 denotes a clamp capacitance, 24 denoting a MOS switch for inputting a clamp potential into the clamp capacitance 23, the clamp capacitance 23 and the MOS switch 24 constituting a clamp circuit. Reference numerals 25 to 28 denote MOS transistors for switching, 29 denotes a differential amplifier for maximum value detection, and 30 denotes a differential amplifier for minimum value detection which also operates as an AF signal output circuit, each differential amplifier constituting a voltage follower circuit. An output of the differential amplifier 22 is inputted into the maximum value detection circuit via the clamp circuit, and is also inputted into the minimum value detection circuit which also operates as the AF signal output circuit, via the clamp circuit.

Reference numeral 31 denotes a MOS switch for maximum value output, 32 denotes a MOS switch for minimum value output, 33 denotes an OR circuit, 10 denoting a scanning circuit, 34 denotes a NMOS transistor for constant current, and 35 denotes a PMOS transistor for constant current. As shown in FIG. 4, the final stage of the minimum value detection circuit is constituted by a PMOS source follower circuit, and the final stage of the maximum value detection circuit is constituted by a NMOS source follower circuit. The output of the scanning circuit 10 is inputted into the OR circuits, so as to make the minimum value output from each AF sensor unit successively and selectively outputted. Reference numeral 36 denotes a common output line to which a signal from the pixels or the minimum value output is outputted.

Details of the operation of this circuit are explained in Japanese Patent Application Laid-Open No. 2000-180706, and hence are explained roughly here.

The MOS transistor 21 for resetting is turned on by a signal φRES to reset the photodiode. The MOS transistors 26, 27 for switching are turned on by signals φN1 and φN2, so as to make an output of the differential amplifier 22 held in the clamp capacitance 23 via the MOS transistor 25 for switching, the maximum value detection circuit (the minimum value detection circuit), and the MOS transistor 27 for switching. The signal held in the clamp capacitance contains offset components of the differential amplifiers constituting the maximum value detection circuit and the minimum value detection circuit. Accordingly, when the signal from the differential amplifier 22 is inputted into the clamp circuit and outputted via the maximum value detection circuit and the minimum value detection circuit, the signal whose offset components of the differential amplifiers are eliminated can be outputted. The maximum value output is outputted to the AGC circuit by turning on all of the MOS switches 31 for maximum value output by φPEAK. The minimum value output is outputted to the common output line 36 by turning on all of the MOS switches 32 for minimum value output via the OR circuits 33 by φBTM. The AF signal is also outputted to the common output line 36 by turning on the MOS switches 32 for minimum value output successively by the scanning circuit via the OR circuits 33 (at this time, the minimum value detection circuit is operated as the AF output circuit). When the minimum value detection circuit 30 outputs a minimum value, the MOS 38 of constant current in FIG. 4 is turned off, and when the minimum value detection circuit 30 is operated as the AF output circuit, the MOS 38 of constant current is turned on.

In the above described circuit configuration, a feedback type noise clamp circuit, which is provided for a preceding stage of each of the maximum value detection circuit and the minimum value detection circuit, makes it possible to eliminate the reset noise generated in the photodiode and the FPN generated in the sensor amplifier, the maximum value detection circuit, and the minimum value detection circuit. Also, a voltage follower circuit whose final output stage is constituted in the source follower form, is provided for each pixel, and at the time of minimum value output, a constant current source for the output stage of each voltage follower is turned off, and each voltage follower is commonly connected to the output line connected to a constant current source, as a result of which the minimum value of the AF sensor signal can be obtained. When the AF sensor signal is outputted, the constant current source connected to the output stage of each voltage follower is turned on, so as to make each voltage follower circuit successively connected to the output line, as a result of which serial AF sensor signals can be obtained. With the above described operation, the minimum value detection circuit can be operated as the signal output circuit, as a result of which the chip size can be reduced.

Next, an effect of the arrangement of the linear sensor for standard portion and the linear sensor for reference portion of the fifth and the sixth paired linear sensors L5, L6, is explained.

Figure 5:
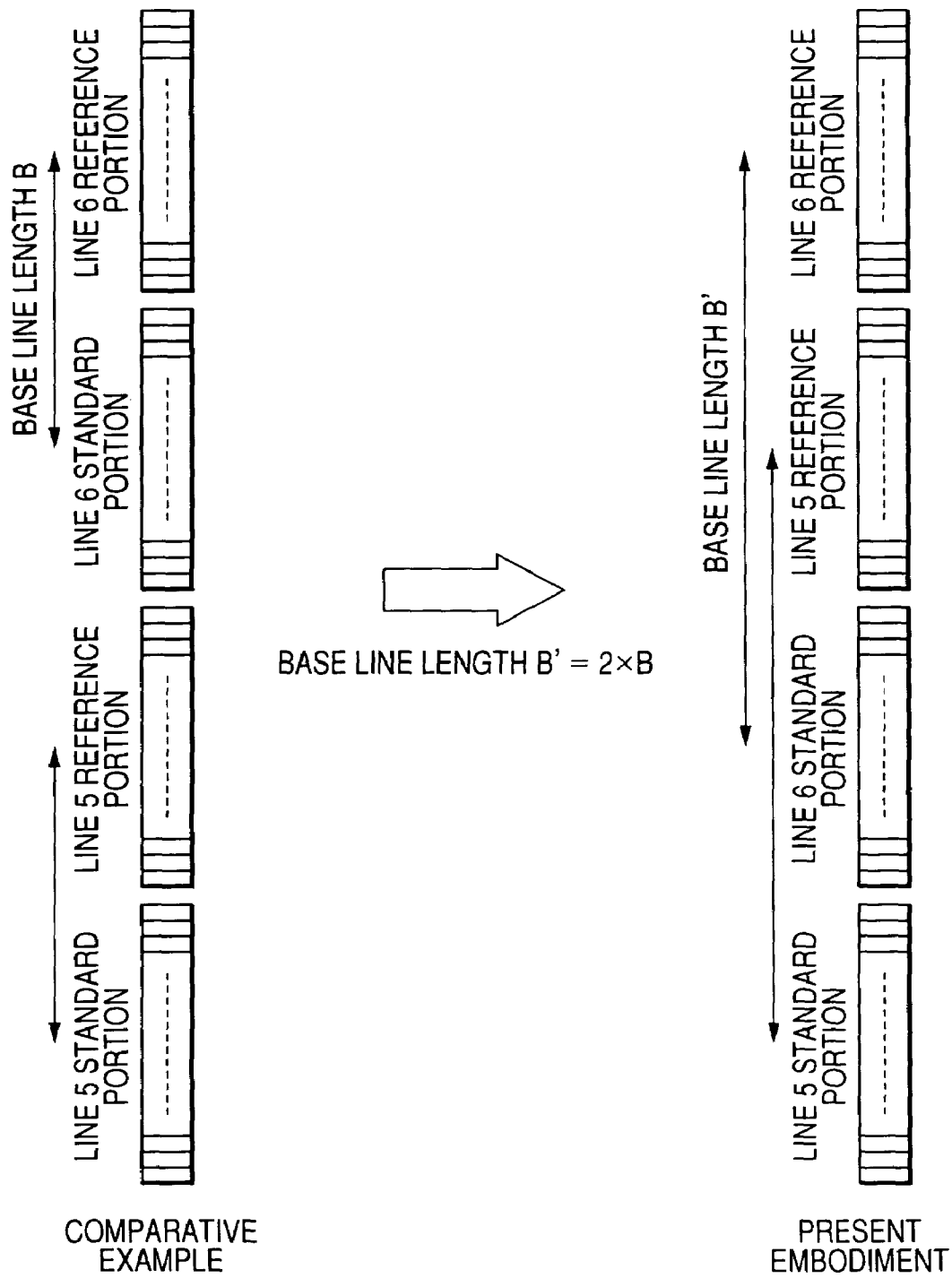
FIG. 5 is a figure explaining an effect of the first embodiment according to the present invention.

FIG. 5 is a figure explaining a basic line length in an arrangement of a comparative example in which the fifth paired linear sensors and the sixth paired linear sensors are arranged in series, and a base line length in the arrangement of the present embodiment in which the linear sensor for standard portion and the linear sensor for reference portion of the fifth and sixth paired linear sensors L5, L6 are arranged in the order as shown in FIG. 2.

In the comparative example shown in FIG. 5, the base line length (distance between optical centers of the linear sensor for standard portion and the linear sensor for reference portion) becomes B (B representing a fixed distance), in each of the paired linear sensors L5 and the paired linear sensors L6. On the other hand, in the present embodiment shown in FIG. 5, the linear sensor for standard portion (line 6-standard portion) of the sixth paired linear sensors is arranged between the linear sensor for standard portion (line 5-standard portion) and the linear sensor for reference portion (line 5-reference portion), of the fifth paired linear sensors. Further, the linear sensor for reference of the fifth paired linear sensors (line 5-reference portion) is arranged between the linear sensor for standard portion (line 6-standard portion) and the linear sensor for reference portion (line 6-reference portion) of the sixth paired linear sensors. As a result, the base line length B' becomes B'=2×B. Also, the base line of the fifth paired linear sensors and the base line of the sixth paired linear sensors are overlapped.

In this way, when the base lines are made to overlap with each other, the base line length B' becomes doubled (B'=2×B), in spite of the same area as the comparative example.

Figure 6:
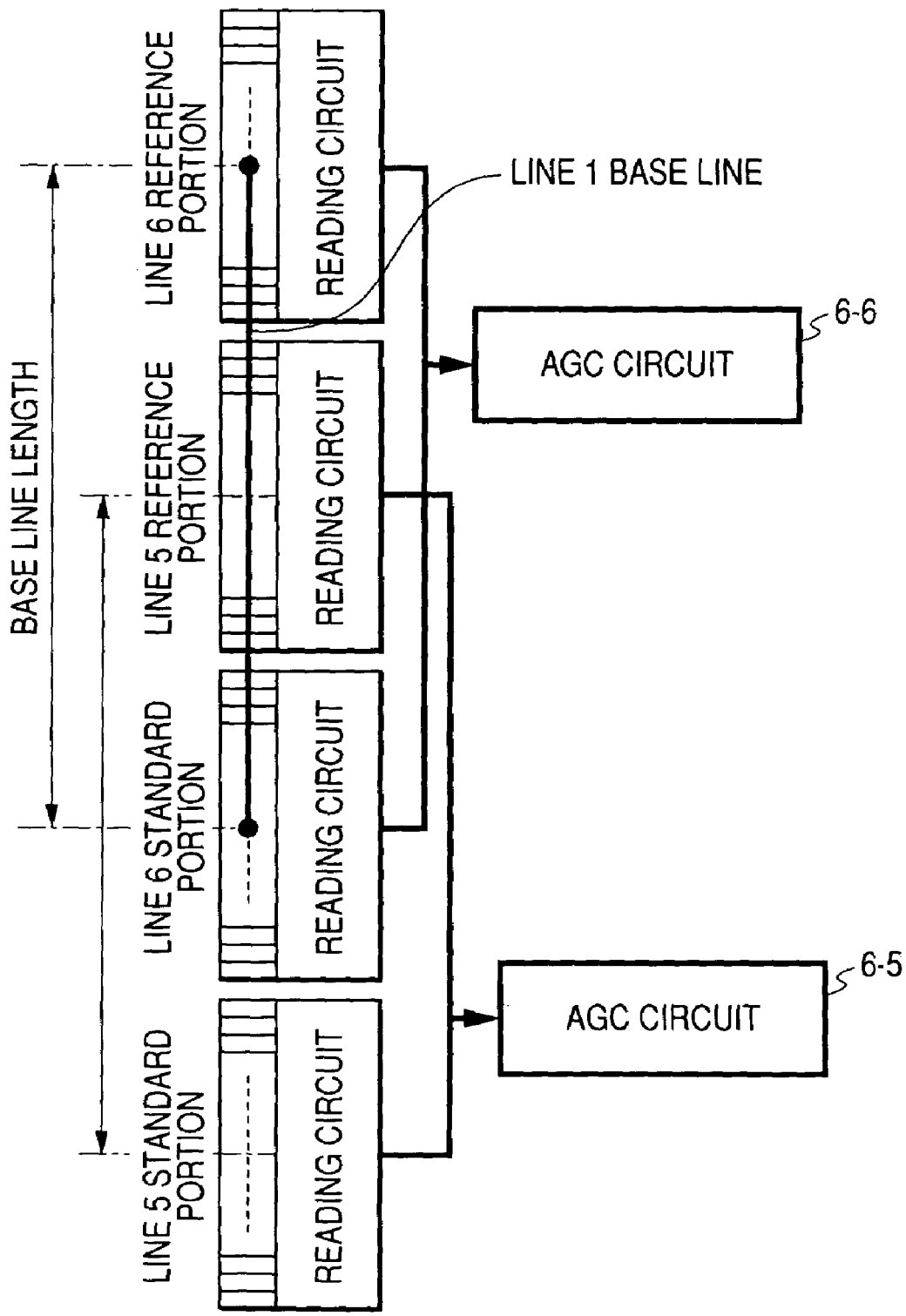
FIG. 6 is a figure explaining AGC of the first embodiment according to the present invention.

In the case where AGC (automatic gain control) is performed to linear sensors provided for a same range finding point in driving the AF sensor, the followings are considered when one of the paired linear sensors is arranged between the other paired linear sensors, as in the present embodiment. That is, in the case where a CCD is used as the photoelectric conversion element, there is a possibility that the layout of charge transfer path becomes complicated so as to increase the chip size. However, the use of CMOS linear sensor enables the output line to be freely laid out with metallic wiring, and hence the overlap wiring for connecting the reading circuits to the AGC circuits 6-5, 6-6 can also be laid out easily, as shown in FIG. 6. This provides a feature that the chip area need not be increased, and hence the use of the CMOS linear sensor is preferred.

In general, there is an adverse effect that an increase in the number of the paired linear sensors causes the AF sensor to become slow in operation speed. However, in the present embodiment, as shown in FIG. 6, the AGC circuits 6-5, 6-6 are provided for each of the paired linear sensors, and the storage period control (AGC) of each of the paired linear sensors is independently performed in parallel drive processing, thereby enabling increased operation speed and precision to be attained. The independent control of the AGC is described, for example, in Japanese Patent Application Laid-Open No. 2003-107340. Accordingly, a high-speed response which is the same as that of prior arts, can be attained without lowering the speed, even in the case where the number of linear sensors is increased. It is preferred to perform the storage period control in real time. The current consumption also causes no problem because of the CMOS circuit. In the present embodiment, not only the photoelectric conversion element but also all elements (logic, analog elements) are constituted by CMOS circuits, so as to constitute the CMOS solid-state image sensor which can be manufactured in the CMOS process (not all components need be constituted by CMOS circuits).

All of the photodiode arrays 2 constituting the linear sensors are preferably made to have a same size, which makes it possible to reduce the development load, the development period and the development cost. In addition, the photoelectric conversion characteristics of the photodiode arrays 2 are also made to be uniform, so that a compensation system (for sensibility variation, shading, and the like) can also be simplified.

In present embodiment, the solid-state image sensor for automatic focus having a highly precise automatic focus capability can be realized, even by using the manufacturing process and design rules which are the same as before. In addition, the fact that the chip size need not be enlarged, is also advantageous for reducing the cost.

Of course, the present invention is also applicable for VMIS (Threshold Voltage Modulation Image Sensor), BCAST (Buried Charge Accumulator and Sensing Transistor array), LBCAST (Lateral Buried Charge Accumulator and Sensing Transistor array), and the like. In particular, the present invention can be implemented for the BCAST and the LBCAST by replacing the MOS transistors for amplification with JFET transistors, without any substantial modification.

Second Embodiment

Figure 7:
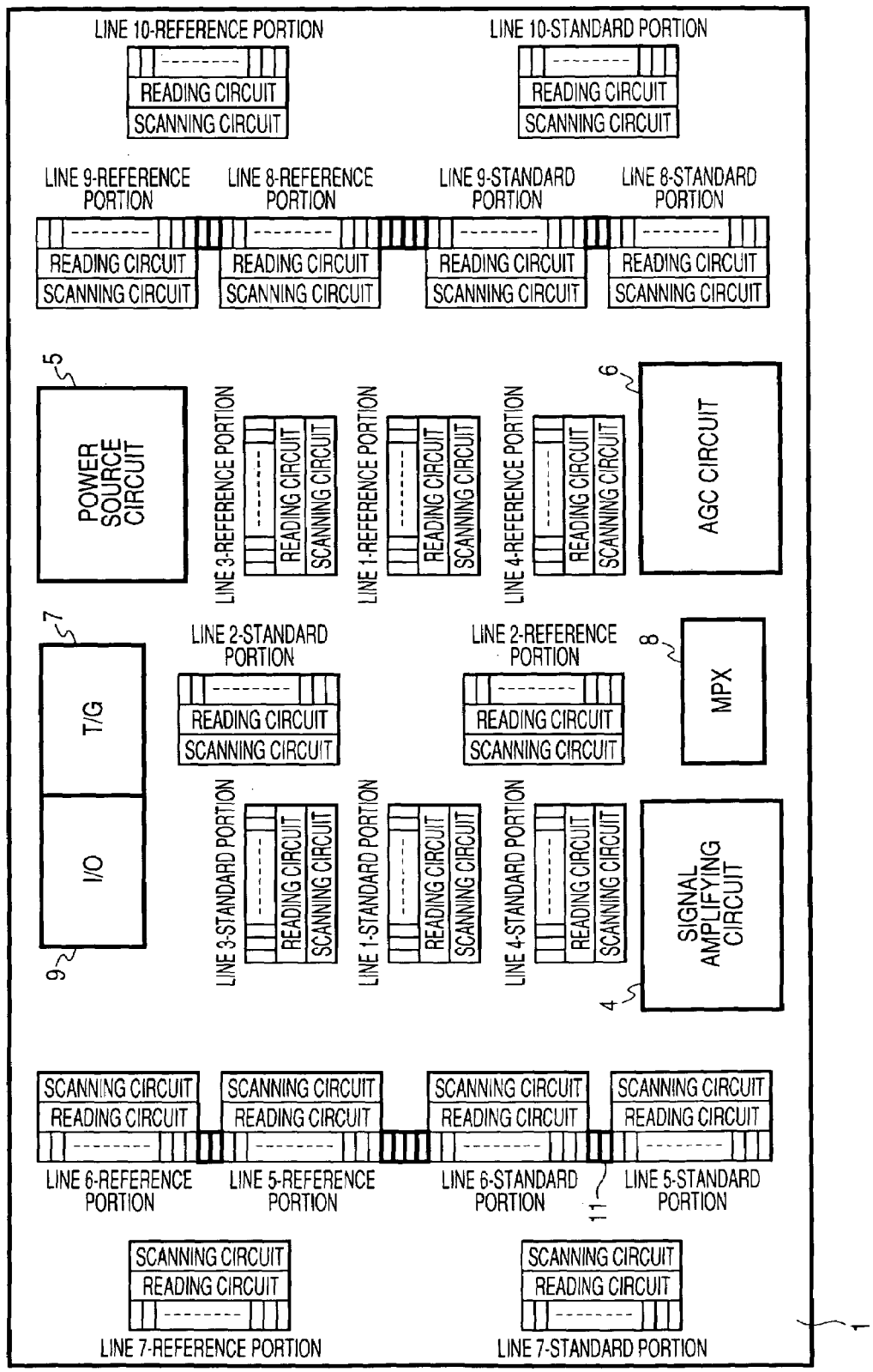
FIG. 7 shows a plane layout of a second embodiment according to the present invention.

FIG. 7 shows a plane layout of a second embodiment according to the present invention. In FIG. 7, the same components as those in FIG. 1 are denoted by the same reference numerals and the explanation thereof is omitted. In the present embodiment, the base lines are arranged to overlap with each other, and photodiodes as the dummy pixel are also arranged between linear sensors without a gap. As shown in FIG. 7, the dummy pixels are provided between a pair of the linear sensor for standard portion and the linear sensor for reference portion (between the line 6-standard portion and the line 5-reference portion), and between linear sensors for standard portion (between the line 5-standard portion and the line 6-standard portion). Further, the dummy pixel is provided between the linear sensors for reference portion (between the line 5-reference portion and the line 6-reference portion). Also, there may be a case where the dummy pixel is provided only for one of the locations between the line 6-standard portion and the line 5-reference portion, between the line 5-standard portion and the line 6-standard portion, and between the line 5-reference portion and the line 6-reference portion. The dummy pixel is also provided for the eighth and the ninth paired linear sensors in the same manner as in the fifth and the sixth paired linear sensors.

In the first embodiment, spaces between each of the photodiode arrays serve as an element isolation area (for example, LOCOS area), but in the present embodiment, dummy pixels are provided for the spaces. The provision of the dummy pixels 11 makes the layout pattern uniform (making the wiring density and active areas formed in a uniform manner), so that the working precision of the process can be improved so as to increase the yield. According to the present embodiment, a solid-state image sensor for automatic focus with an increased yield can be provided.

Third Embodiment

Figures 8, 8A:
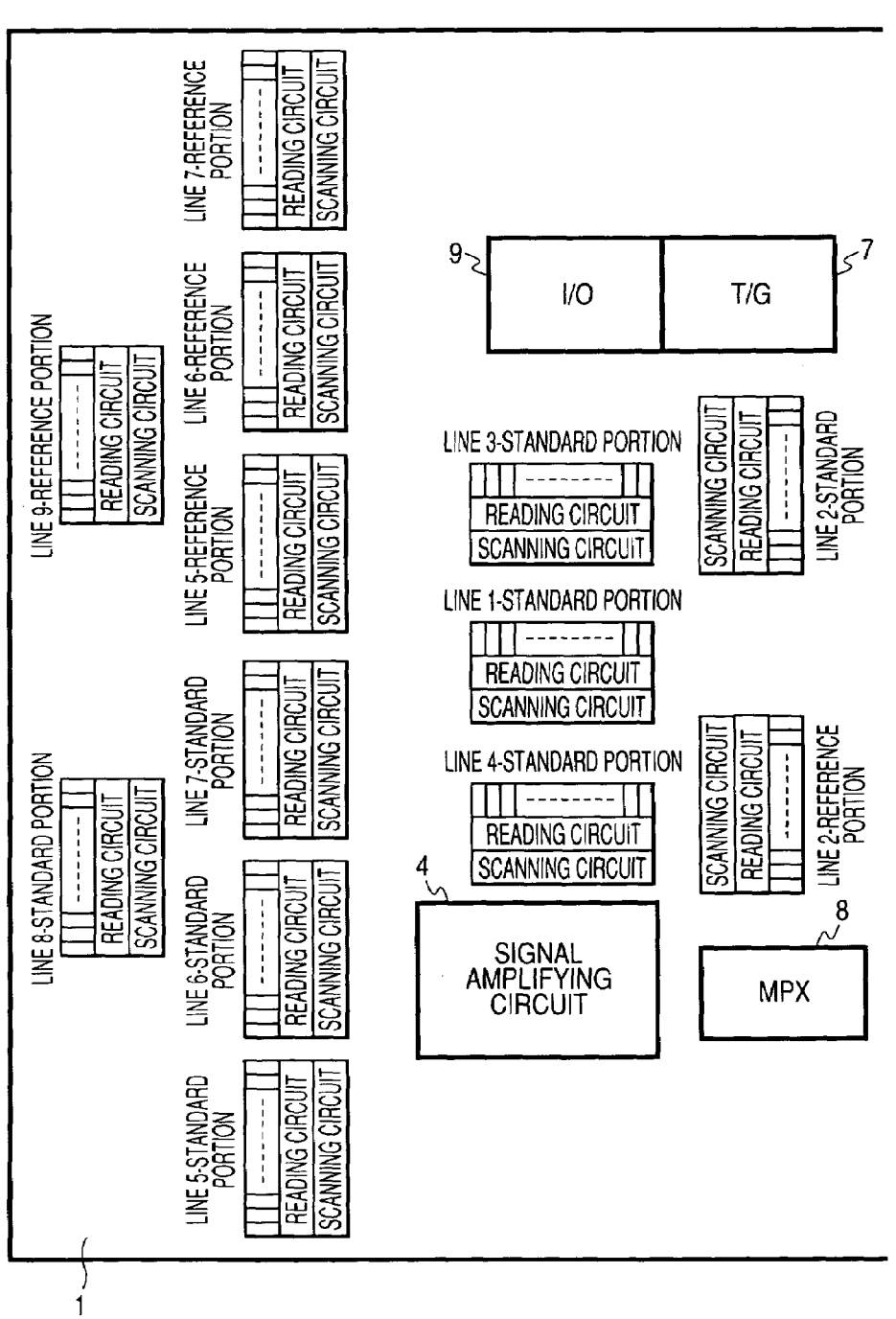
FIG. 8 is comprised of FIGS. 8A and 8B showing plane layouts of a third embodiment according to the present invention.
Figure 8B:
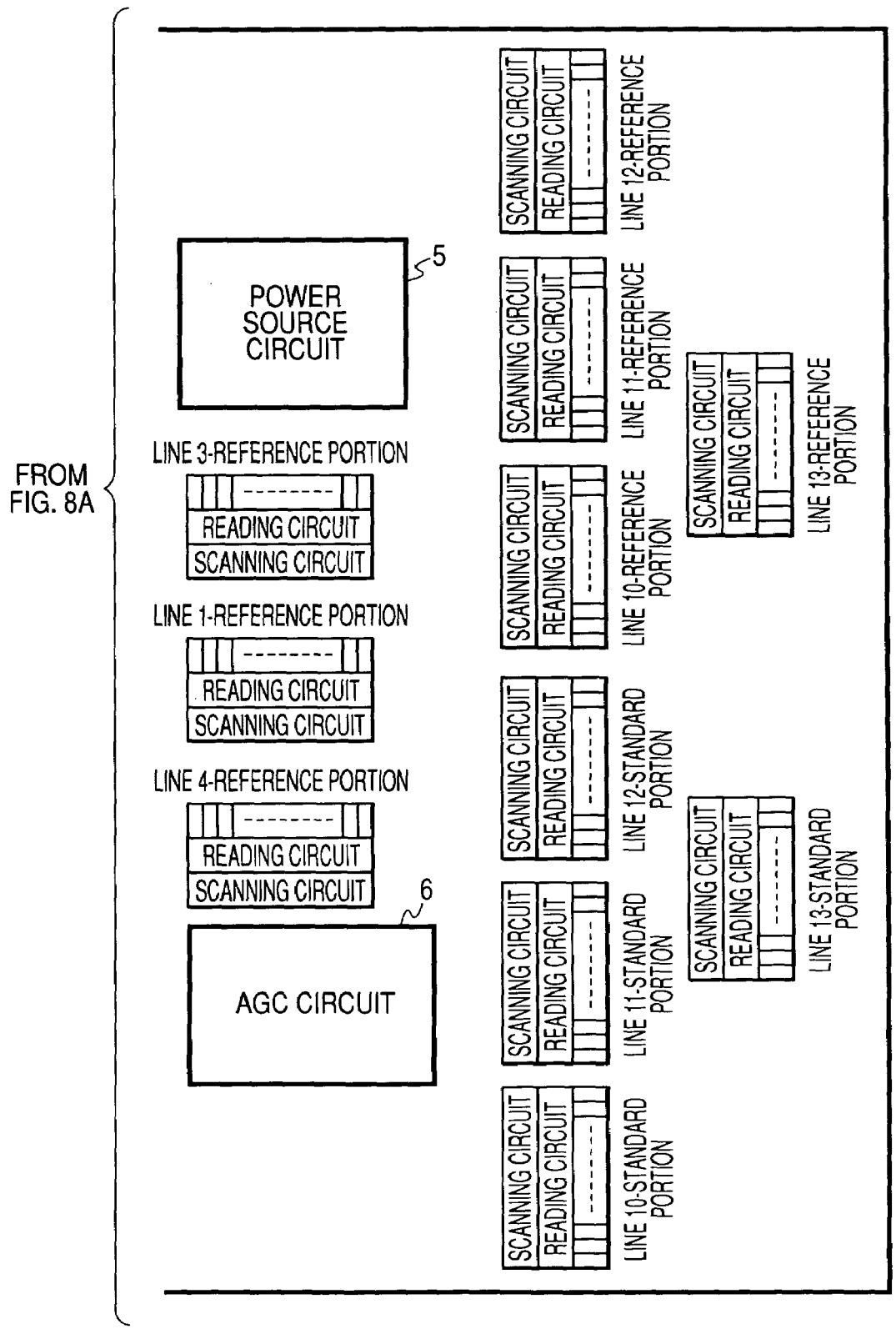

FIGS. 8A and 8B show plane layouts in a third embodiment according to the present invention. In FIGS. 8A and 8B, the same components as those in FIG. 1 are denoted by the same reference numerals and the explanation thereof is omitted. In the present embodiment, an example in which the base lines of three linear sensors are arranged to overlap with each other is described.

As shown in FIGS. 8A and 8B, the linear sensors for standard portion and the linear sensors for reference portion of the fifth to the seventh paired linear sensors in the present embodiment are arranged in the order of the line 5-standard portion, the line 6-standard portion, the line 7-standard portion, the line 5-reference portion, the line 6-reference portion, and the line 7-reference portion.

In present embodiment, the linear sensors for standard portion (the line 6-standard portion, the line 7-standard portion) of the sixth and the seventh paired linear sensors are arranged between the linear sensor for standard portion (the line 5-standard portion) and the linear sensor for reference portion (the line 5-reference portion) of the fifth paired linear sensors. Further, the linear sensor for standard portion (the line 7-standard portion) of the seventh paired linear sensors and the linear sensor for reference portion (the line 5-reference portion) of the fifth paired linear sensors are arranged between the linear sensor for standard portion (the line 6-standard portion) and the linear sensor for reference portion (the line 6-reference portion) of the sixth paired linear sensors. Further, the linear sensors for reference portion (line 5-reference portion, line 6-reference portion) of the fifth and the sixth paired linear sensors are arranged between the linear sensor for standard portion (line 7-standard portion) and the linear sensor for reference portion (line 7-reference portion) of the seventh paired linear sensors.

In the arrangement shown in FIGS. 8A and 8B, the linear sensors for standard portion (line 5-standard portion, line 6-standard portion, line 7-standard portion) of the fifth to the seventh paired linear sensors are arranged in the order, so as to constitute the linear sensor area for standard portion. Further, the linear sensors for reference portion (line 5-reference portion, line 6-reference portion, line 7-reference portion) of the fifth to seventh paired linear sensors are arranged in the order, so as to constitute the linear sensor area for reference portion (here, the linear sensor area for standard portion and the linear sensor area for reference portion are arranged adjacent to each other). In addition, the interval between the linear sensor for standard portion and the linear sensor for reference portion of each paired linear sensors is also arranged to become the same.

In the tenth to twelfth paired linear sensors, the linear sensor for standard portion and the linear sensor for reference portion are also arranged in the same manner as those in the fifth to the seventh paired linear sensors.

Figures 9, 9A:
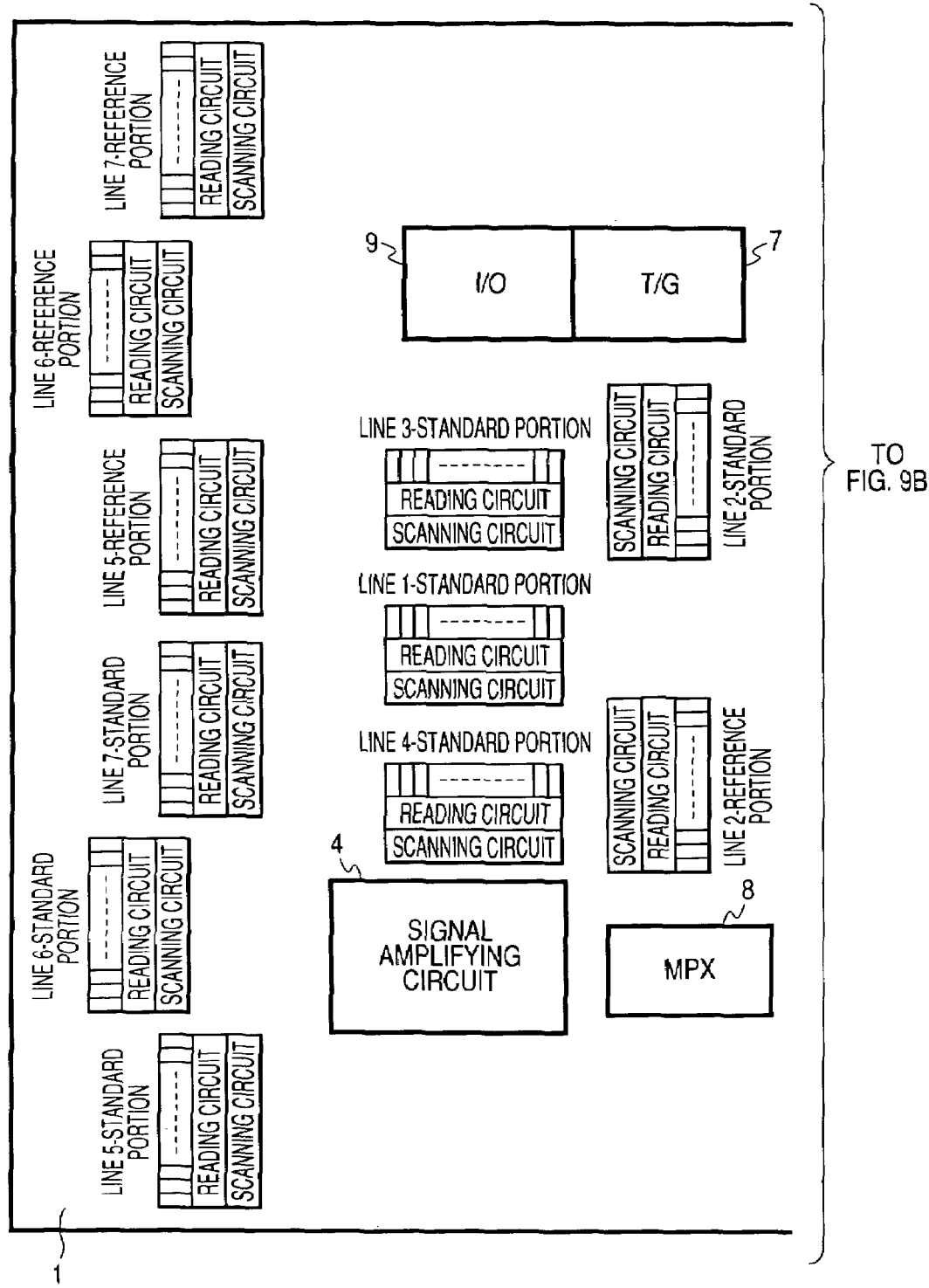
FIG. 9 is comprised of FIGS. 9A and 9B illustrating figures explaining another form of the third embodiment according to the present invention.
Figure 9B:
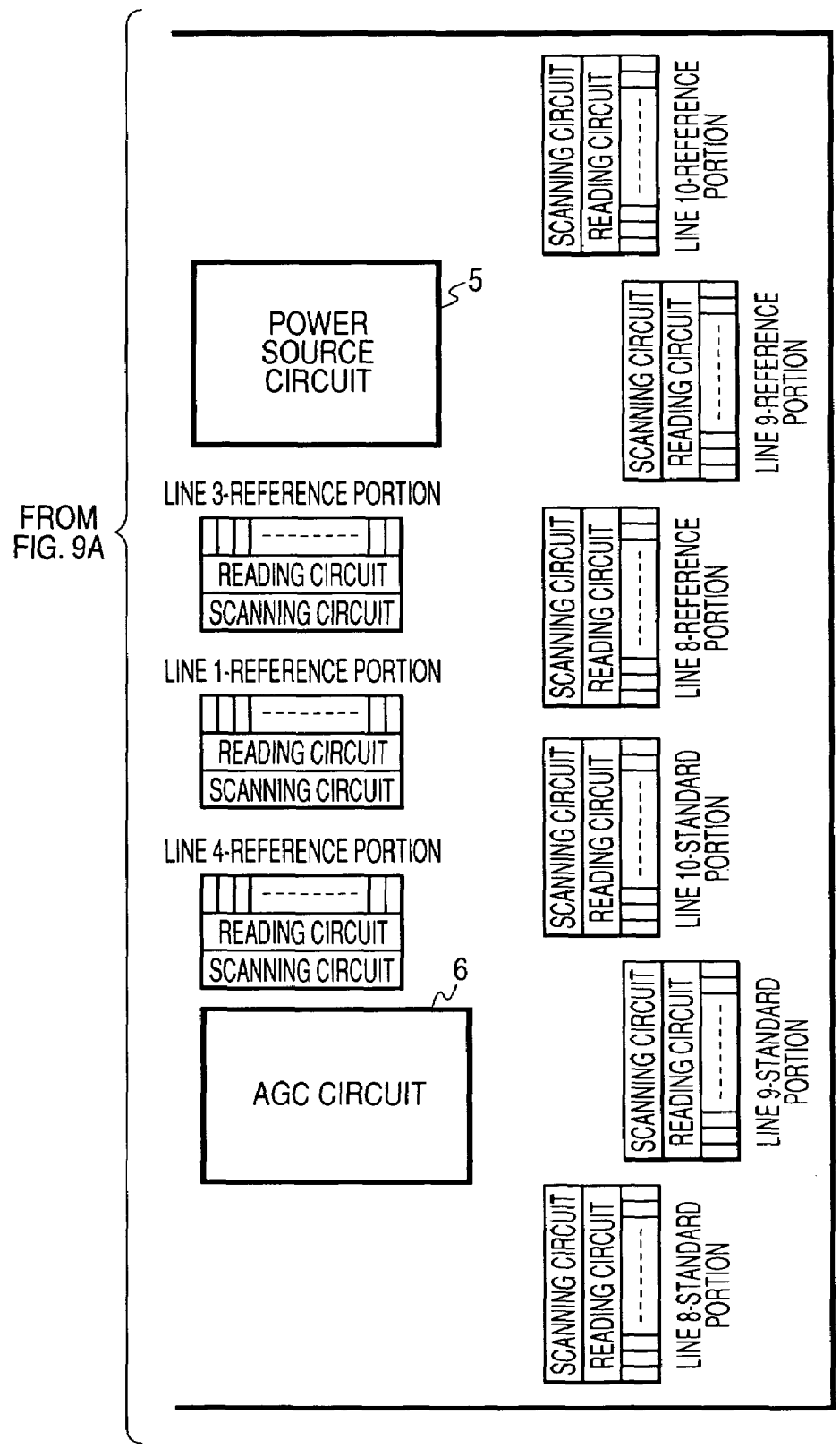

In the present embodiment, it is possible to make the base line length 3 times the conventional one, by making the baselines of three linear sensors overlap with each other. Of course, four or more linear sensors may also be made to overlap with each other. In addition, as shown in FIGS. 9A and 9B, the linear sensors need not be provided on the same line. Here, the linear sensor for standard portion (line 6-standard portion) and linear sensor for reference portion (line 6-reference portion) of the sixth paired linear sensors are disposed away from the same line. Further, the linear sensor for standard portion (line 9-standard portion) and the linear sensor for reference portion (line 9-reference portion) of the ninth paired linear sensors are disposed away from the same line. In the present embodiment, the automatic focus precision can be further improved.

Fourth Embodiment

Figure 10:
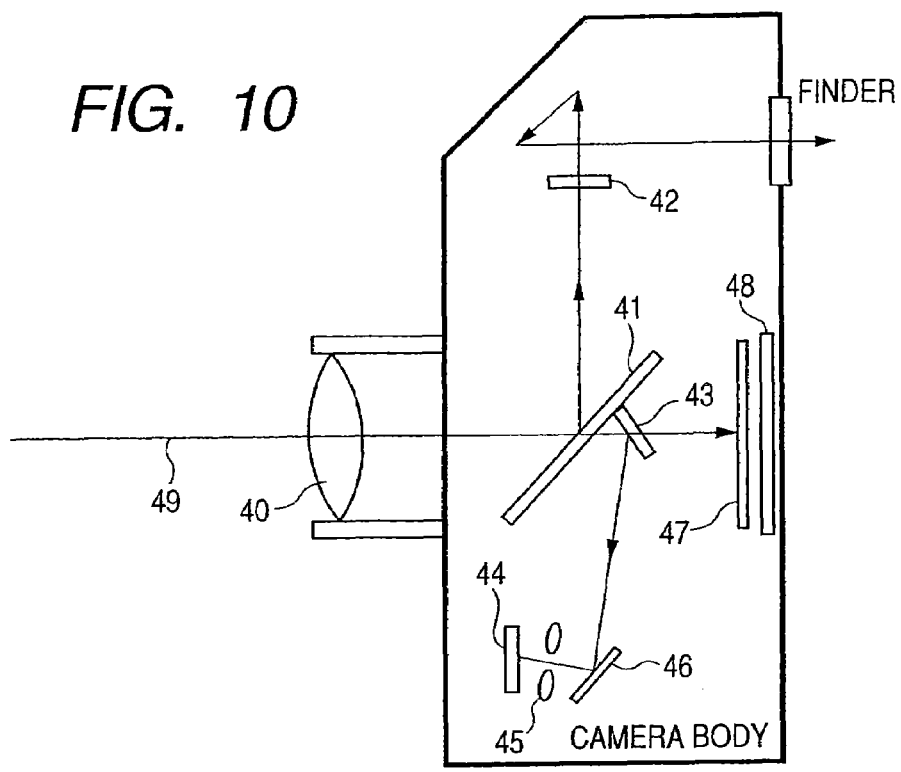
FIG. 10 is a figure showing a camera system of a fourth embodiment according to the invention.
Figure 11:
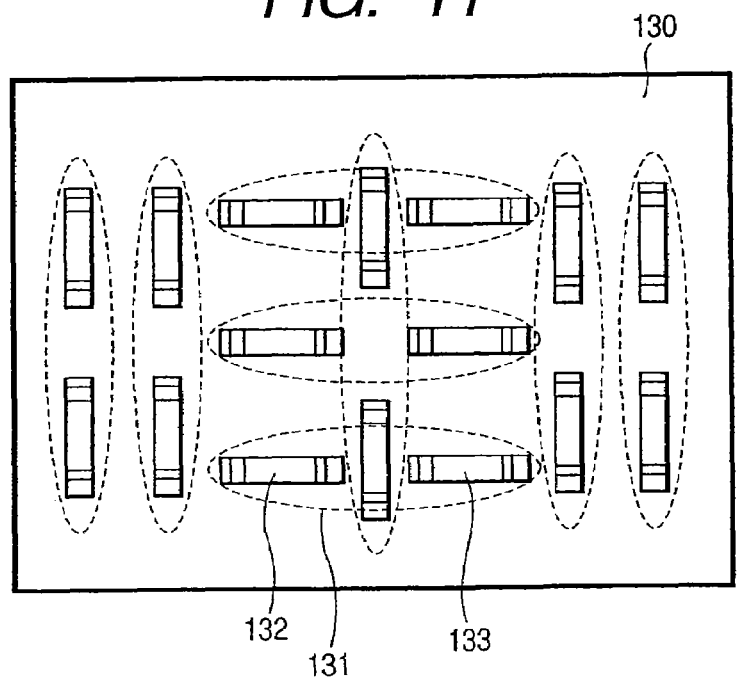
FIG. 11 is a figure showing a linear sensor arrangement of a conventional AF sensor.
Figure 12:
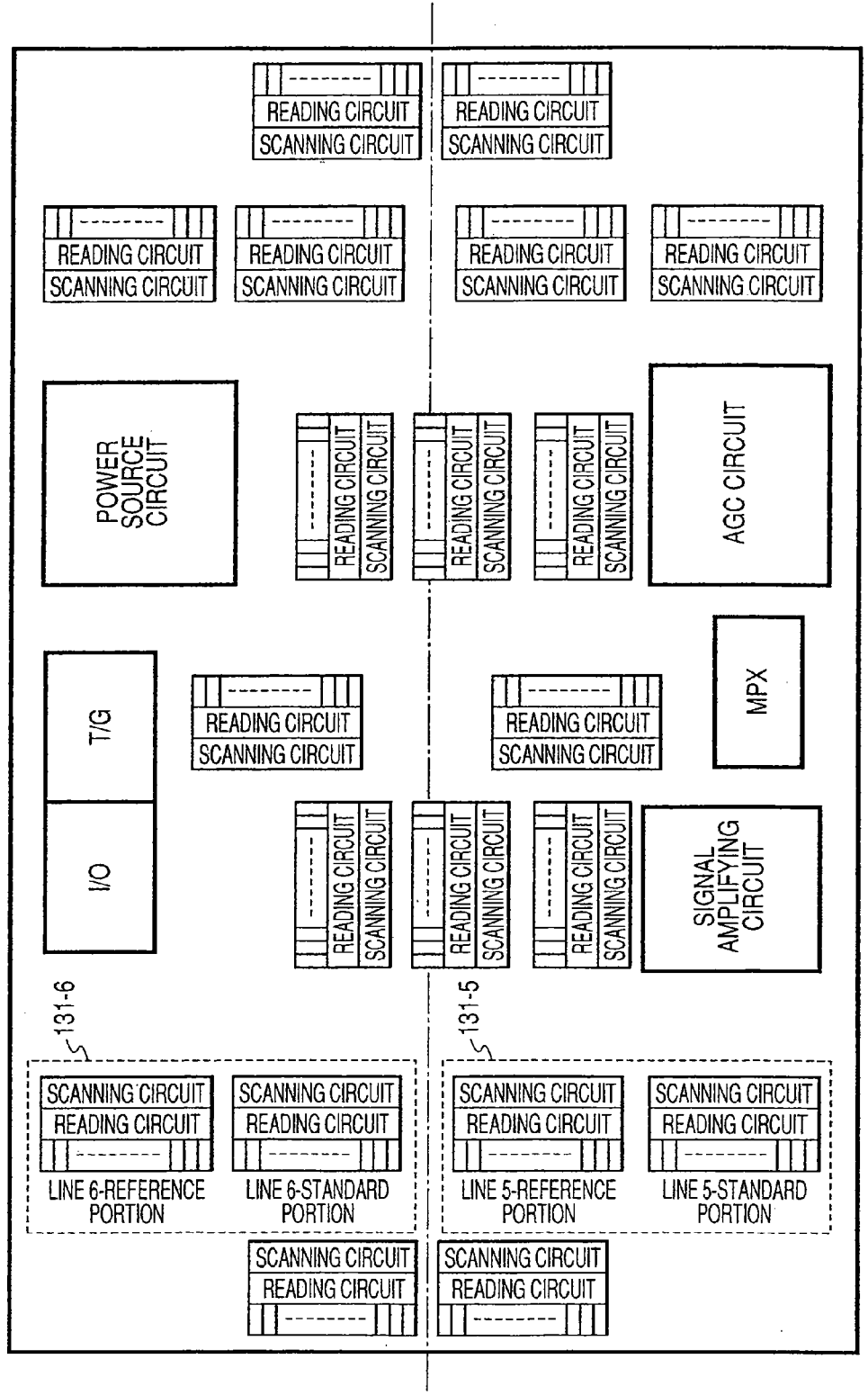
FIG. 12 shows a plane layout of the conventional AF sensor.
Figure 13:
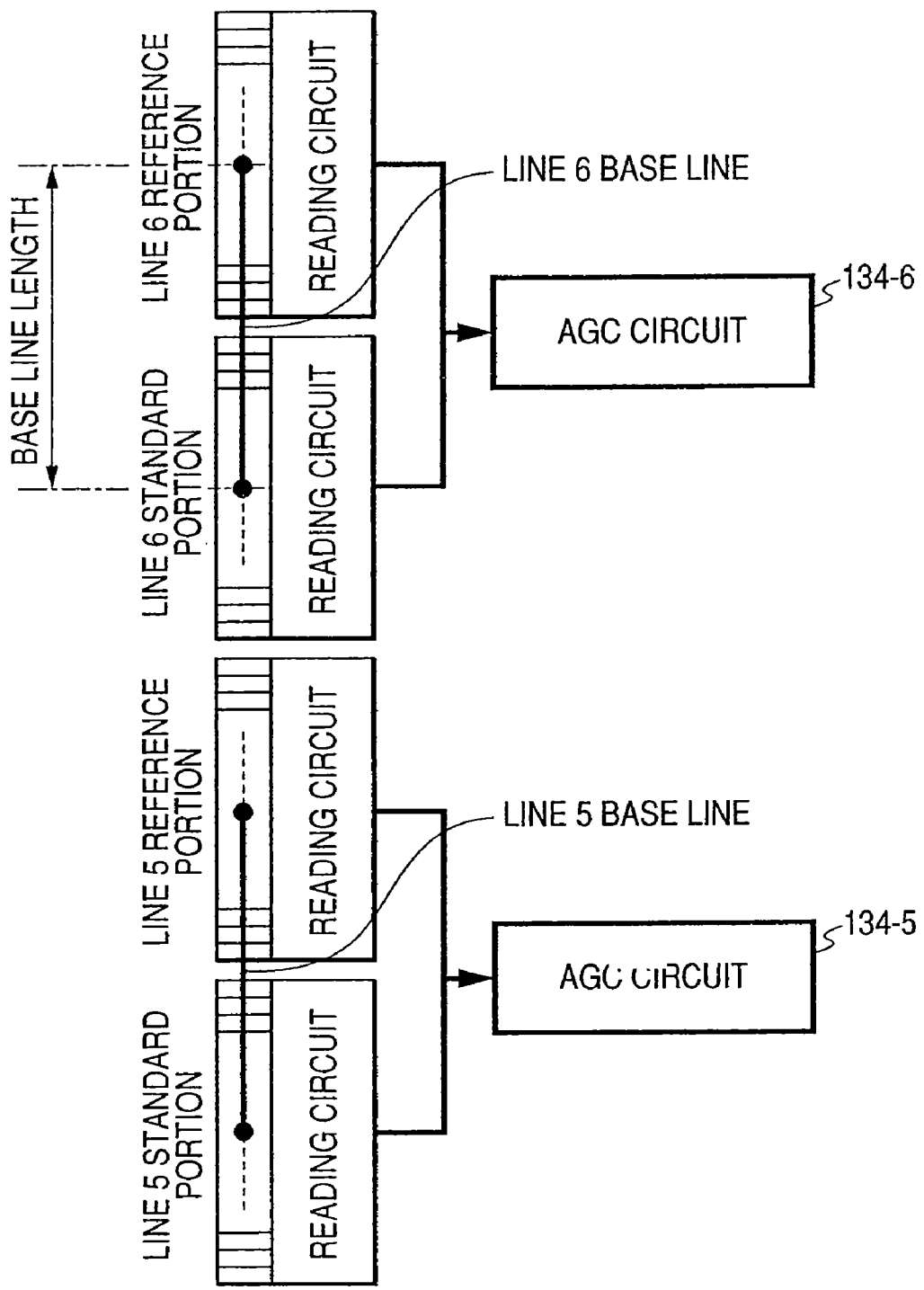
FIG. 13 is a figure explaining AGC of the conventional AF sensor.
Figures 14, 14A:
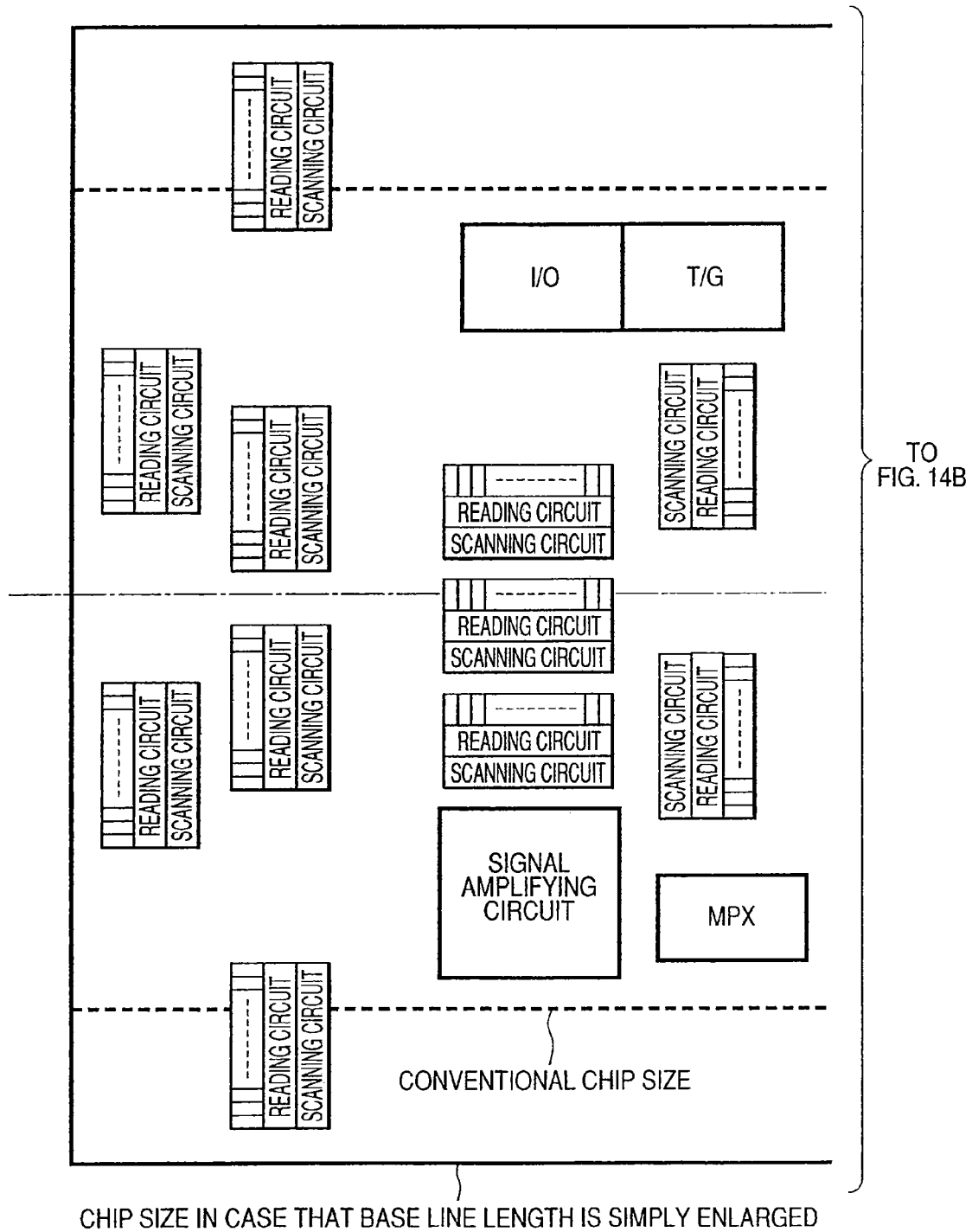
FIG. 14 is comprised of FIGS. 14A and 14B illustrating figures explaining a problem of the conventional AF sensor.
Figure 14B:
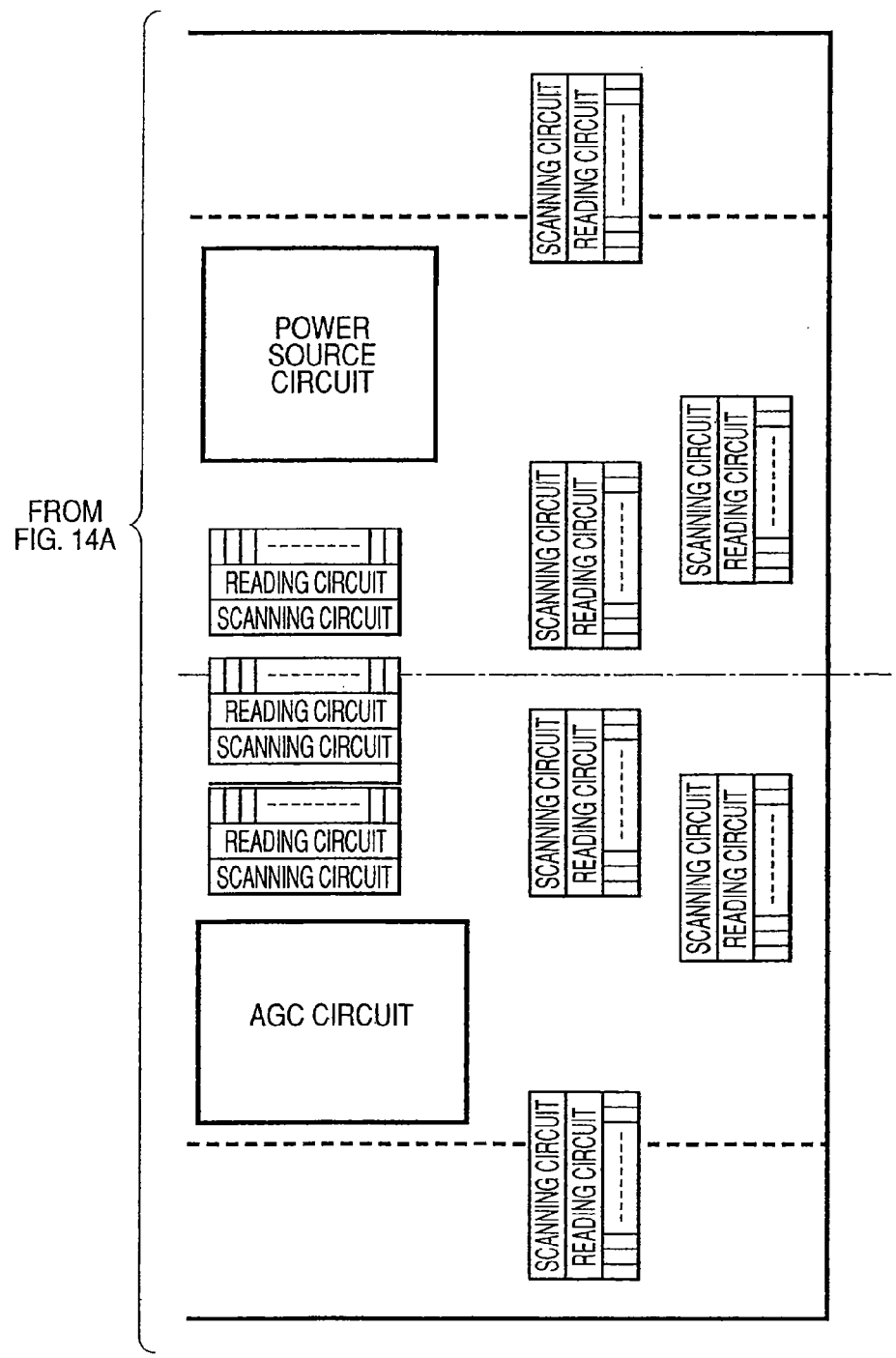

FIG. 10 is a schematic representation of an optical system of a single lens reflex camera provided with a TTL-SIR type automatic focus system using the present invention. In FIG. 10, reference numeral 40 denotes a photographing lens which temporarily forms an object image on a film and an image sensor, and 41 denotes a quick return mirror which reflects light to a finder screen 42, and which serves as a half mirror transmitting light by several tens of percent. Reference numeral 43 denotes a sub-mirror for guiding light to the AF system, 44 denotes an AF sensor of a solid-state image sensor for automatic focus, 45 denotes a secondary image forming lens (glass lens) which re-focus an object image on the AF sensor 44, and 46 denotes a reflective mirror guiding light to the AF sensor 44. Further, reference numeral 47 denotes a focal plane shutter, 48 denotes a film or an image sensor, and 49 denotes a main axis of light.

In the present embodiment, it is possible to realize a single lens reflex camera having a higher automatic focus precision than the conventional one, by using the solid-state image sensor for automatic focus as described in the first to the third embodiments, without increasing the cost. It is obvious that the present invention is applicable for any TTL-SIR type AF camera, regardless of whether the camera is an analog camera or a digital camera.

The present invention can be used for a device provided with a TTL-SIR (Through The Lens Secondary Imaged Registration) type automatic focus sensor, for example, an automatic-focus camera, and the like.

This application claims priority from Japanese Patent Application No. 2004-246797 filed on Aug. 26, 2004, which is hereby incorporated by reference herein.

What is claimed is:

1. A solid-state image sensor for automatic focus having at least first and second paired linear sensors, each comprising a linear sensor for standard portion and a linear sensor for reference portion for performing phase difference detection type focus detection,
the linear sensor for standard portion of said second paired linear sensors being arranged between the linear sensor for standard portion and the linear sensor for reference portion of said first paired linear sensors, the linear sensor for reference portion of said first paired linear sensors being arranged between the linear sensor for standard portion and the linear sensor for reference portion of said second paired linear sensors, and a dummy pixel being provided for at least one of portions between said linear sensor for standard portion and said linear sensor for reference portion, which are adjacent to each other, between said plural linear sensors for standard portion, and between said plural linear sensors for reference portion.

2. The solid-state image sensor for automatic focus according to claim 1, wherein said linear sensors for standard portion and said linear sensors for reference portion of said first and second paired linear sensors are arranged on a same straight line.

3. The solid-state image sensor for automatic focus according to claim 1 or 2, wherein an area in which said linear sensor for standard portion is arranged and an area in which said linear sensor for reference portion is arranged are adjacent to each other.

4. The solid-state image sensor for automatic focus according to claim 1, wherein each of the linear sensors comprises a pixel of a same size.

5. The solid-state image sensor for automatic focus according to claim 1, wherein a storage period of photoelectric charge of each photoelectric conversion element in said first and second paired linear sensors is independently controlled.

6. The solid-state image sensor for automatic focus according to claim 5, wherein said photoelectric conversion element is an amplification type photoelectric conversion element, and wherein the storage period control is performed in real time by using the amplification type photoelectric conversion element.

7. The solid-state image sensor for automatic focus according to claim 6, comprising a CMOS solid-state image sensor which can be manufactured by a CMOS process.

8. An automatic focus camera comprising the solid-state image sensor according to claim 1.

* * * * *